Figure 1:
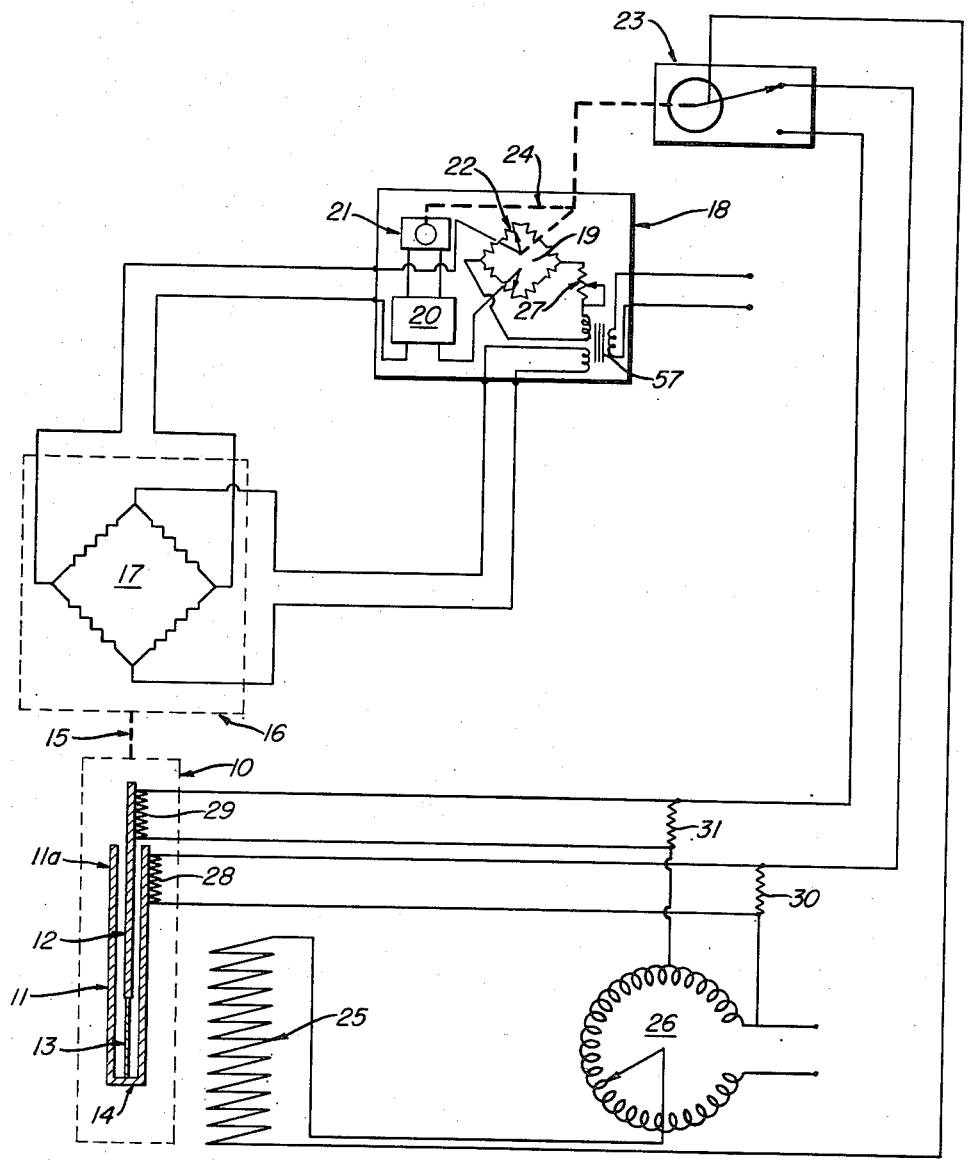

June 14, 1955

P. N. RANDALL 2,710,886

COMPENSATED TEMPERATURE SENSING DEVICE
FOR AN ELECTRIC FURNACE

Filed Dec. 22, 1952

3 Sheets-Sheet 1

INVENTOR.
Pryor N. Randall
BY
Everett A. Johnson
ATTORNEY

June 14, 1955

P. N. RANDALL 2,710,886

COMPENSATED TEMPERATURE SENSING DEVICE
FOR AN ELECTRIC FURNACE

Filed Dec. 22, 1952

3 Sheets-Sheet 3

INVENTOR.
Pryor N. Randall

BY Everett A. Johnson

ATTORNEY

United States Patent Office 2,710,886
Patented June 14, 1955

2,710,886

COMPENSATED TEMPERATURE SENSING DEVICE FOR AN ELECTRIC FURNACE

Pryor N. Randall, Homewood, Ill., assignor to Standard Oil Company, Chicago, Ill., a corporation of Indiana Application December 22, 1952, Serial No. 327,374

4 Claims. (Cl. 13—24)

This invention relates to temperature sensing devices of the thermal expansion type. More specifically, the invention pertains to temperature control of small furnaces where very close control at elevated temperatures is desired.

A conventional temperature sensing element for measuring and controlling furnace temperatures in the range from approximately 500° F. to 2000° F. is a thermocouple. When very close control, of the order of ±2° at 1000° F. is required, the change in E. M. F. of the thermocouple per degree change in temperature becomes a serious limitation. Also the stability of calibration of the thermocouple is a problem when the control of temperature must be maintained for periods of weeks or months, such as in metal creep testing.

Briefly, my invention comprises an apparatus including a differential thermal expansion sensing element and an electrical displacement gage combined with a controller to give a furnace control system of high sensitivity and wide range. The device is particularly useful in temperature control for metal creep testing furnaces where the requirements are very severe.

It is, therefore, an object of my invention to provide a high temperature sensing and controlling device which is rugged in construction, which has long-time stability, is more sensitive over a broader temperature range than conventional thermocouples, and is more nearly simultaneously responsive to anticipated temperature changes than has heretofore been possible. These and other objects of my invention will become apparent to those skilled in the art as the description thereof proceeds.

My invention utilizes the difference in thermal expansion of a rod within a metal tube, mounted in the furnace to be controlled, to actuate a displacement-sensitive electrical gage. The output of this gage when fed to an electronic controller is amplified and used to actuate relays for the control of heat input to the furnace. The relays also control anticipatory heaters on the rod and on the tube. The heater on the rod receives current when the furnace is on low voltage, thereby causing the controller to anticipate the resulting drop in furnace temperature. The heater on the tube receives current when the furnace is on high voltage causing the controller to anticipate the resulting rise in furnace temperature.

Advantages of my apparatus include (a) the change in electrical output per degree change in temperature of the furnace can be made many times that of a thermocouple, (b) the sensing element comprising the bayonet rod and an enclosing tube means has good long-time stability, and (c) control can be accomplished at any desired temperature level without changing the range of the electronic controller by simple adustment of the linkage between the displacement-sensitive electrical gage and the tube-and-rod.

Figure 2:
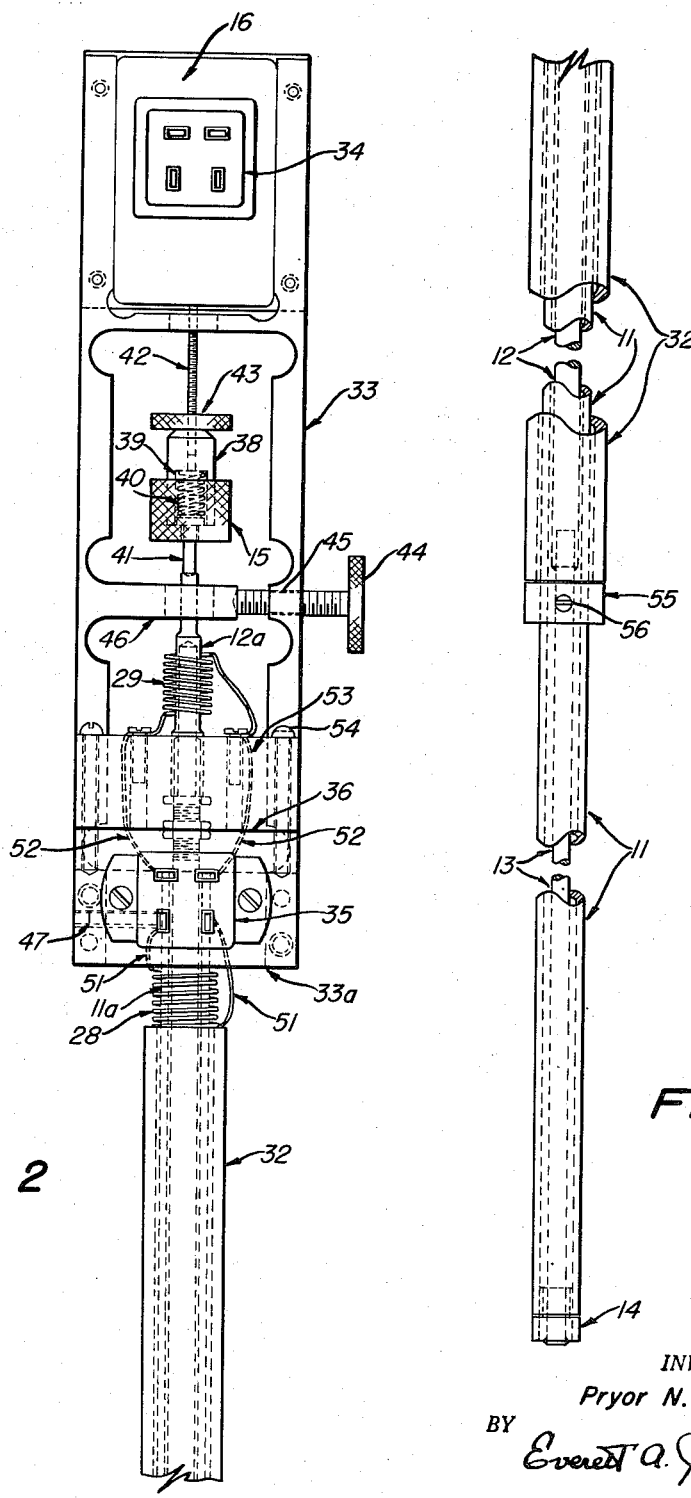
Figure 3:
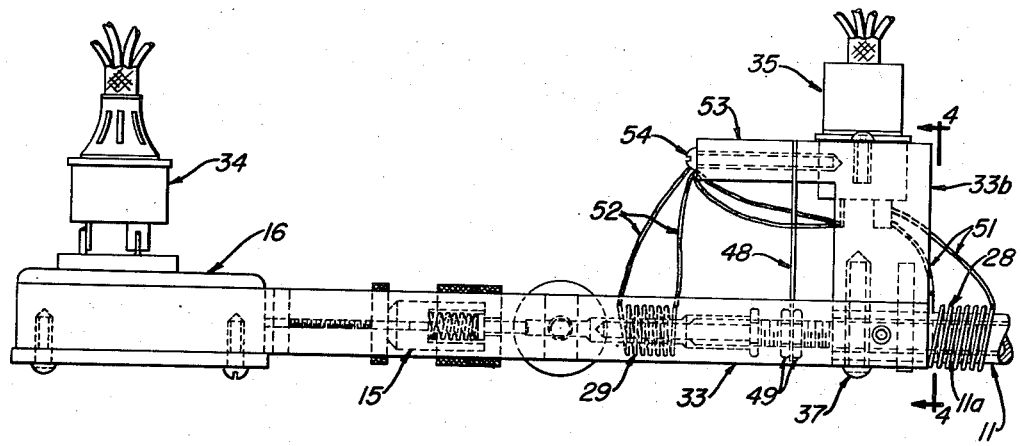
Figure 4:
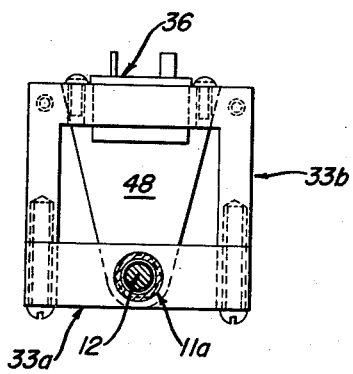

Other features and details of my invention will appear from the description when taken with the accompanying drawings wherein:

Figure 1 is a schematic diagram illustrating one installation employing my invention;

Figures 2 and 2a comprise a front elevation of the temperature sensing device;

Figure 3 is a fragmentary side elevation of the device illustrated in Figures 2 and 2a; and Figure 4 is a section taken along the line 4—4 in Figure 3.

Referring to the drawings, and Figure 1 in particular, a thermal expansion temperature sensing means 10 comprises a tube 11, a motion transmitting rod 12 and a low expansion rod 13. The rod 13 is fixed to the closed end 14 of tube 11 and is of material which has a lower coefficient of expansion than the tube 11 and the rod 12. A mechanical and adjustable linkage 15 is provided between the temperature sensing means 10 and the displacement gage 16. The differential expansion of the rod 13 and tube 11 is thereby transmitted to the displacement sensitive gage 16. The displacement applied longitudinally to the transducer linkage 15 is translated into an exact electrical equivalent by means of a complete balanced resistance bridge 17 of strain sensitive wire.

The controller 18 includes a balanced bridge 19, an amplifier 20, and a balancing motor 21. The principle of operation of the control circuit is that the amplifier 20 and balancing motor 21 combination "sees" the difference in output of the resistance bridge 17 in the displacement gage 16 and the bridge 19 in the controller 18. The mechanical drive of balancing motor 21 required to move the slidewire 22 on the control bridge 19 to maintain the two bridges 17 and 19 in adjustment is also used to operate the relay 23 through the linkage 24. The operation of the relay 23 changes the voltage across the furnace winding 25 by the amount of the voltage difference between the "high" and "low" taps on the autotransformer 26.

The transformer 57 supplies power to the Wheatstone bridge 17 in the displacement gage 16 and also, through span adjustment rheostat 27, to the bridge 19 in the circuit of the controller 18. The bridge span adjustment and the zero adjustment on the controller 18 are made manually.

When the furnace temperature, as determined by the heat output of the furnace winding 25 is approaching the control point or desired temperature level from below, the position of relay 23 will be as shown in Figure 1 causing the furnace to be on "high" voltage. Since the furnace temperature will be rising it causes a continuous change in the relative position of the upper end of the rod 13 and of the tube 11 of the sensing device 10. Concurrently, the change is enhanced by expansion of the upper end 11a of the tube 11 which is receiving heat from the anticipatory heater 28 on the tube 11. The expansion causes a continuous change in the output of the displacement gage 16 and this in turn causes the balancing motor 21 to make continuous adjustment in the position of the slidewire contact 22 on the controller bridge 19.

At some chosen position of slidewire 22 the relay 23 is tripped and the voltage on the furnace winding 25 is dropped from "high" to "low." This immediately causes the upper end 11a of the tube 11 to cool and the upper end of the transmitting rod 12 to be heated by its anticipatory heater 29. The drop in voltage in the furnace winding 25 also soon causes a reversal in the upward trend of furnace temperature and begins the approach to the control point from above.

This effect plus the action of the heater 29 on the rod 12 eventually causes the relay means 23 to change the voltage from "low" back to "high." The amplitude of the swing in furnace temperature as determined by the furnace winding 25 is thus minimized by the use of the anticipatory heaters 28 and 29 and their effect can be controlled by adjusting the shunts 30 and 31, respectively to give the same extent of anticipation on approach to the control point from above as from below. The effect of the heaters is to provide a transient increment in differential expansion between the tube and the rod assembly. In the event that tube 11 is the element of lower coefficient of expansion then heaters 28 and 29 are interchanged.

The anticipatory heaters 28 and 29 may suitably comprise resistance windings which surround the tube 11a and rod 12a respectively as illustrated in Figure 2 and radiate heat to them when carrying current as described herein.

In Figures 2, 2a, 3 and 4 I have illustrated in more detail the structural features of the temperature sensing means 10, the linkage 15 and the displacement gage 16 all of which are in a unitary assembly adapted to extend the tube 11 and sheath 32 through a furnace wall.

Referring to Figures 2 and 2a in particular, the displacement gage 16 is mounted in a frame 33 together with the terminal 11a of the tube 11, transmitting rod 12 and a linkage 15. The gage 16 is provided with a four-prong socket 34 for receiving a correspondnig plug making the connections to the controller 18. Another four-prong socket 35 is provided adjacent the anticipatory heaters 28 and 29 and is mounted on socket support 36 which may comprise an inverted U member 33b which is fixed to the frame 33 by means of bolts 37.

Coarse adjustment of the linkage 15 between the end 12a of the rod 12 and the gage 16 is provided by threaded connector 38 including a recess 39 with compression spring 40 acting on plunger 41 which in turn is brought into contact with exposed end 12a of the rod 12. A threaded stem 42 extends from the gage 16 and this stem is threaded into the male portion of the connector 38 with locking nut 43 securing the elements on the actuating stem 42.

To obtain a finer adjustment, the sides of the frame 33 are distended by the adjustment of a thumb screw 44 extending through a threaded bore 45 in one side of the frame 33 to contact the stub cross member 46. The fine adjustment is made by spreading the sides of the frame 33 by turning thumb screw 44 against stub cross member 46.

The tube and rod assembly 10 is mounted axially of the frame 33 through a bore in an end cross member 33a. A set screw 47 retains the tube 11a within the frame member 33a. Lateral motion of the rod 12—13 relative to the tube 11 is prevented by a triangular flexure plate 48 mounted from above on U member 33b and fixed axially of the rod 12a by the lock nuts 49.

The pairs of leads 51 and 52 to the heaters 28 and 29 are connected to the corresponding prongs of the socket 35. An insulating block 53 which is held to the frame support 33b by bolts 54 brings the leads around the flexure plate 48.

The tube 11 may be made of stainless steel with a cap plug 14 at its outer end. The expansion rod 13 is fixed to plug 14 and to an end of transmitting rod 12. Enclosing a portion of the tube 11 is a heat-insulating ceramic sheath 32 which is held in place by collar 55 and set screw 56. The ceramic sheath 32 shields that portion of the tube 11 containing the transmitting rod 12 and acts to keep the temperature of the two equal thereby avoiding any relative motion due to differential expansion within the shielded portion. The unshielded portion of tube 11 is exposed to the temperature controlled zone.

The extension rod 12 which has one end in contact with the expansion rod 13 and the other end in contact with the plunger 41 of the gage 16 through linkage 15 may be of stainless steel. The temperature sensing rod 13 may be of quartz or of tungsten, preferably the latter, and has one end secured to the extension rod 12. The other end of the expansion rod 13 is fixed to the cap or end block 14 which is integral with the end of the tube 11.

In a typical installation tube 11, sheath 32 and the enclosed expansion rod 13 depend through a furnace wall into the heated zone to be controlled. The operation is then according to that described in connection with Figure 1.

Upon a drop in temperature about the exposed section of the tube 11 the low expansion rod 13 will contract with the tube 11, but to a lesser degree, and by means of its transmitting or extension rod 12 will depress the operating stem 42 of the gage 16 by means of the linkage 15. This will result in a change in the bridge 17 within the displacement gage 16 causing an unbalance between it and the controller bridge 19. Balance is restored by the balancing motor 21 and slidewire 22 of the controller 18 and the relay 23 is simultaneously actuated to increase the power input to the furnace winding 25 and to energize the anticipatory heater 28 on the tube 11.

When the temperature rises, the expansion rod 13 will expand only a negligible amount in comparison with the expansion of the stainless steel tube. As the tube 11 becomes extended the expansion effect will be transmitted by the transmission rod section 12 since the enclosed end 13a of the expansion rod 13 is fixed to the end closure 14 of the stainless steel tube 11. This will in turn withdraw the operating stem 42 to cause an unbalance in the bridge 17 within the displacement gage 16. Consequently, the controller bridge 19 is unbalanced with respect to the displacement bridge 17 and the balancing motor 21 again actuates the mechanical linkage 24 to control the slidewire 22 and the relay 23.

My invention has been described in connection with a displacement gage of Statham type which is a resistance wire strain gage made by Statham Laboratories, Los Angeles, California, and is sensitive to one millionth of an inch displacement. Such a system is described, for example, in an article entitled "Applications of unbonded-type resistance gages" by Richard D. Meyer in Instruments, vol. 19, March 1946, pages 136–139. Other types of displacement gages such as those employing a differential transformer, a magnetic strain gage, or a mechano-electrical transducer vacuum tube may be used instead. The magnetic strain gage uses the principle of the impedance bridge to produce an electrical signal proportional to displacement and is described in more detail in a paper entitled "Design and applications of a magnetic strain gage" by B. F. Langer, Proceedings of the Society for Experimental Stress Analysis, vol. 1, No. 2 (1944), pages 82 to 92. The differential transformer is described in a paper entitled "The linear variable differential transformer" by H. Schaevitz, Proceedings of the Society for Experimental Stress Analysis, vol. IV, No. 2 (1947), pages 79 to 88. The mechano-electrical transducer is an electron tube which has one movable element actuated by a small rod which protrudes through a diaphragm in the envelope of the tube. Further details of such a transducer are found in an article entitled "Mechano-electronic transducers" by H. F. Olson, Journal of the Acoustical Society of America, vol. 19, No. 2 (March 1947), pages 307 to 319. The differential transformer is less sensitive, the magnetic strain gage is about as sensitive, and the vacuum tube is more sensitive than the resistance wire strain gage described herein. If other types of displacement gages are used, the associated controller circuit is accordingly modified, but that used with a resistance strain gage is simple and highly stable and is, therefore, preferred.

Although specific embodiments of my invention have been described in considerable detail, it should be understood that these are by way of illustration only and that the invention is not necessarily limited thereto. Furthermore, in view of the described and illustrated apparatus, modifications therein will become apparent to those skilled in the art and such modifications and alternatives are contemplated as coming within the scope of my invention.

What I claim is:

1. A thermostatically controlled furnace mechanism comprising a furnace chamber with an electrical furnace winding adapted to control the temperature thereof, a thermo-responsive control means actuating the controls for said furnace winding, said thermo-responsive control device comprising in combination a frame member, a displacement sensitive gage means carried by said frame member, a stainless steel tube closed at one end and having the other end attached to said frame member, a rod having a low coefficient of expansion located in the said tube and fixed to the closed end thereof, the other end of the rod extending into said frame member, a flexure plate fixed to said frame member and supporting the exposed end of said rod means axially of said tube, an adjustable force transmitting linkage means actuated by the free end of said rod means and acting on said displacement gage means, a furnace winding control means including a relay and a controller for actuating said relay, circuit means including said controller and said displacement gage means, said relay being connected to control the supply of current to said furnace winding, a first anticipatory heater about an exposed portion of said rod means within said frame member, a second anticipatory heater about the said tube member adjacent the frame member, said anticipatory heaters being alternately energized by said relay means, whereby when the voltage to the furnace winding is reduced the first anticipatory heater is energized and when the voltage to the furnace winding is increased the second anticipatory heater is energized.

2. A thermo-responsive assembly of the type adapted to control the temperature of an electrically heated apparatus which comprises in combination a tubular member of metal having a high coefficient of expansion and closed at one end, a rod means extending within the said tubular member and fixed to the closed end thereof, the said rod means having a low coefficient of expansion relative to the tube member, an electrical heater associated with said rod means, a second electrical heater associated with the said tubular member, and an electrical control means including a relay for selectively and alternately energizing said electrical heaters.

3. A thermostatic device for regulating temperatures within an electrically heated chamber including in combination a chamber-heating control circuit including an electrical resistance heater, an electrical displacement gage means connected to said circuit, a relay means in said circuit, a tube adapted to project through a wall of the heated chamber, a rod within and fixed to a closed end of said tube, a first anticipatory heater about a portion of said rod means, a second anticipatory heater about an adjacent portion of said tube, a motion transmitting linkage between said rod and said displacement gage means, and electrical leads linking said anticipatory heaters to opposite poles in said relay means whereby supplying increased voltage to the said electrical resistance heater supplies current to the second anticipatory heater while simultaneously cutting off the current to the first anticipatory heater.

4. In a thermostatic control mechanism the combination of an elongated box frame member, rod element adapted to expand and contract longitudinally under the influence of temperature to which the element is subjected, a movable control means, a force transmitting means fixed to said rod, a tubular means closed at one end and adapted to restrain longitudinal movement of said rod element, a yielding coupling means between said force transmitting means and the said control means, a first electrical heater about a portion of said rod element, a second electrical heater about said tubular means adjacent the open end thereof, and relay means responsive to said control means for controlling the supply of current selectively to said first and second heaters.

References Cited in the file of this patent

UNITED STATES PATENTS

| | | |
|---|---|---|
| 764,592 | Johnson | July 12, 1904 |
| 853,738 | Ruud | May 14, 1907 |
| 1,524,571 | Reid | Jan. 27, 1925 |
| 1,533,225 | Colby | Apr. 14, 1925 |
| 1,724,252 | Boker | Aug. 13, 1929 |
| 1,743,843 | Bean et al. | Jan. 14, 1930 |
| 2,272,249 | Parsons | Feb. 10, 1942 |
| 2,422,734 | Jung | June 24, 1947 |
| 2,493,456 | Kaser | Jan. 3, 1950 |
| 2,549,054 | Burling | Apr. 17, 1951 |
| 2,640,129 | Starbird | May 26, 1953 |
| 2,550,188 | Darling | Apr. 24, 1951 |